United States Patent
Cookerly et al.

(10) Patent No.: US 8,567,713 B2
(45) Date of Patent: Oct. 29, 2013

(54) LIFT FAN CLUTCH

(75) Inventors: Al Cookerly, Brownsburg, IN (US); Andrew D. Copeland, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 741 days.

(21) Appl. No.: 12/635,525

(22) Filed: Dec. 10, 2009

(65) Prior Publication Data

US 2011/0024254 A1 Feb. 3, 2011

Related U.S. Application Data

(60) Provisional application No. 61/203,810, filed on Dec. 29, 2008.

(51) Int. Cl.
*B64D 35/00* (2006.01)
*F16D 13/50* (2006.01)

(52) U.S. Cl.
USPC .......................... 244/60; 192/70.28

(58) Field of Classification Search
USPC .............. 244/12.3, 12.4, 17.19, 17.21, 17.23, 244/23 B, 60; 192/70.28
See application file for complete search history.

(56) References Cited

U.S. PATENT DOCUMENTS

| | | | |
|---|---|---|---|
| 810,783 A | 1/1906 | Maxwell | |
| 1,861,080 A | 5/1932 | Chorlton | |
| 3,360,217 A * | 12/1967 | Trotter | 244/12.4 |
| 3,362,255 A * | 1/1968 | De Rocca et al. | 74/665 L |
| 3,822,772 A | 7/1974 | Murakami | |
| 3,884,431 A * | 5/1975 | Burrell | 244/7 A |
| 4,252,224 A | 2/1981 | F'Geppert | |
| 4,466,524 A | 8/1984 | Lane | |
| 4,676,356 A | 6/1987 | Beccaris et al. | |
| 5,383,544 A * | 1/1995 | Patel | 192/70.28 |
| 5,407,150 A * | 4/1995 | Sadleir | 244/12.4 |
| 6,065,718 A * | 5/2000 | Piasecki | 244/17.11 |
| 6,647,820 B2 * | 11/2003 | McKeown et al. | 74/471 XY |
| 6,935,479 B2 * | 8/2005 | Cummins et al. | 192/69.8 |
| 6,988,603 B2 | 1/2006 | Hortenhuber et al. | |
| 2004/0200686 A1 | 10/2004 | Schauer et al. | |

* cited by examiner

*Primary Examiner* — Philip J Bonzell
(74) *Attorney, Agent, or Firm* — Krieg DeVault LLP

(57) ABSTRACT

A multi-plate clutch is provided to couple a drive shaft from a gas turbine engine with a driven shaft of a lift fan. When disengaged the plates of the clutch can be physically separated. Plates of one shaft are coupled to the shaft with individual energy members that return the plates to a disengaged position. The plates of the other shaft can be coupled together with a travel member and/or lug key and energy devices between at least some of the plates.

9 Claims, 4 Drawing Sheets

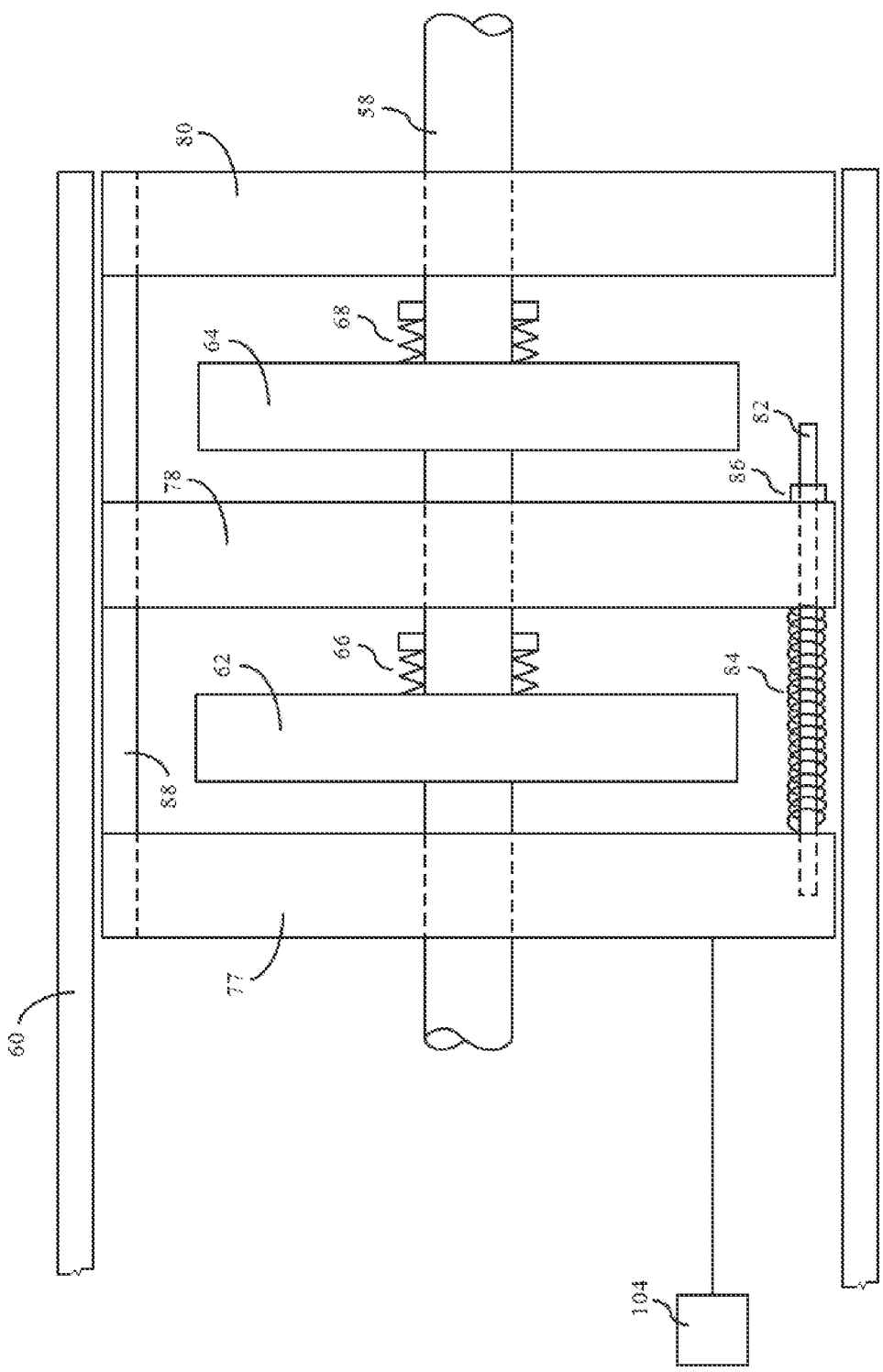

LIFT FAN CLUTCH

CROSS REFERENCE TO RELATED APPLICATIONS

The present application claims the benefit of U.S. Provisional Patent Application 61/203,810, filed Dec. 29, 2008, and is incorporated herein by reference.

GOVERNMENT RIGHTS

The present application was made with the United States government support under Contract No. N00019-02-C-3003, awarded by the U.S. Navy. The United States government has certain rights in the present application.

TECHNICAL FIELD

The present invention generally relates to shaft coupling devices such as clutches, and more particularly, but not exclusively, to clutches used in conjunction with lift fans capable of producing vertical lift for an aircraft.

BACKGROUND

Selectively coupling shafts that are used to drive devices such as lift fans remains an area of interest. Some existing systems have various shortcomings relative to certain applications. Accordingly, there remains a need for further contributions in this area of technology.

SUMMARY

One embodiment of the present invention is a unique multi-plate clutch. Other embodiments include apparatuses, systems, devices, hardware, methods, and combinations for coupling shafts used to drive lift fans. Further embodiments, forms, features, aspects, benefits, and advantages of the present application shall become apparent from the description and figures provided herewith.

BRIEF DESCRIPTION OF THE FIGURES

FIG. 4 depicts an illustration of the embodiments depicted in FIGS. 2, 3a, 3b, and 3c.

DETAILED DESCRIPTION OF THE ILLUSTRATIVE EMBODIMENTS

Figure 1:
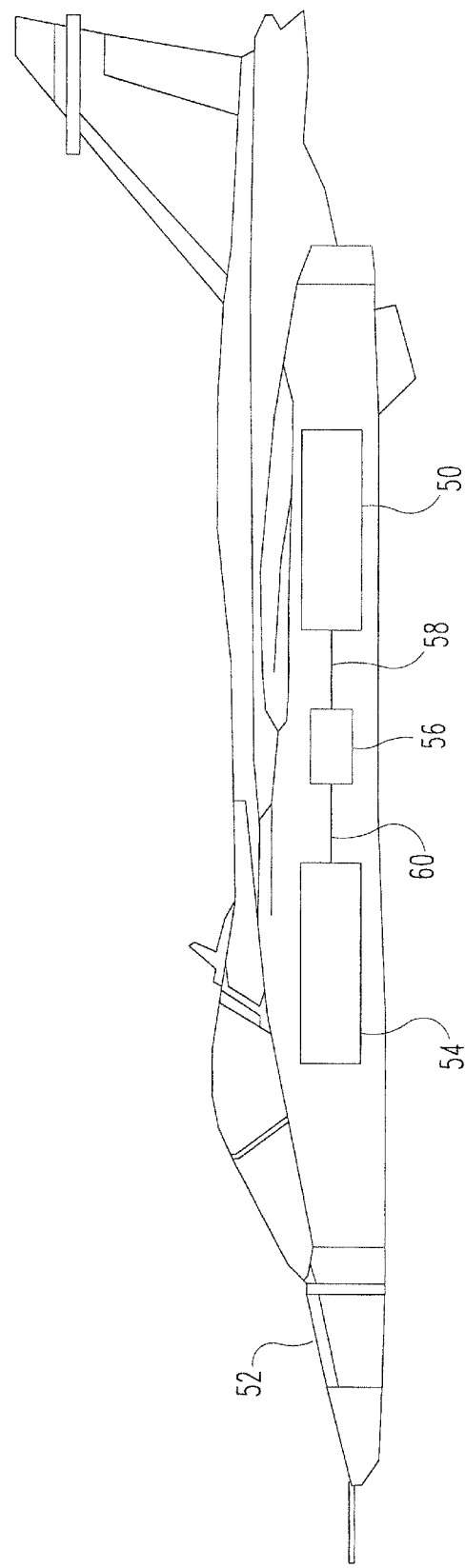
FIG. 1 is a schematic of an aircraft having one embodiment of a lift fan clutch.
Figure 2:
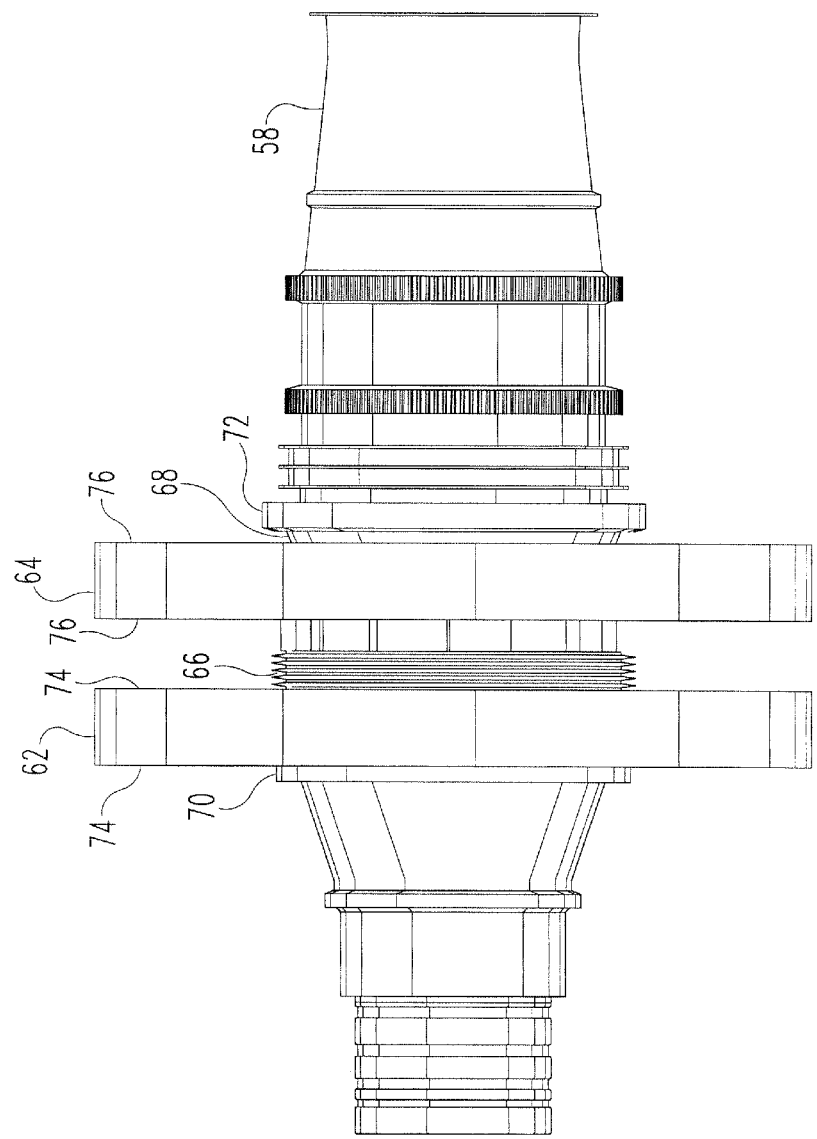
FIG. 2 depicts one embodiment of an input shaft and inner plates.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of an aircraft engine 50 used as a powerplant for an aircraft 52. In one form the aircraft engine 50 can be a gas turbine engine having a variety of forms including turbo jet, turbo fan, and turbo shaft, to set forth just a few non-limiting examples. The aircraft 52 includes a lift fan 54 capable of producing a vertical lift force useful for providing hovering or short takeoff and vertical landing operations, among other uses. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion and other applications known to one of ordinary skill in the art.

A clutch 56 is depicted in FIG. 1 and is used to selectively couple the aircraft engine 50 to lift fan 54. In the illustrative form the clutch 56 is depicted as coupling an input shaft 58 from the aircraft engine 50 to an output shaft 60 of the lift fan 54. In some embodiments the input shaft 58 can be directly coupled to a spool shaft (not depicted) of the aircraft engine 50, but in other embodiments the input shaft 58 can be coupled through any combination of lay shafts, clutches, and/or gearboxes, to set forth just a few non-limiting examples. Furthermore, the output shaft 60 can be coupled to a fan rotor and/or shaft (not shown) of the lift fan 54 through any combination of lay shafts, clutches, and/or gearboxes, to set forth just a few non-limiting examples. The clutch 56 of the illustrative embodiment is a multi-plate clutch having friction surfaces coupled at an inner diameter to one shaft, and friction surfaces coupled at an outer diameter to the other shaft. Further details are provided below.

Turning now to FIGS. 2, 3a, 3b, and 3c, perspective views are shown of an input shaft 58 and an output shaft 60 coupled with respective inner plates 62 and 64 and outer plates 77, 78 and 80. FIG. 4 is a composite illustration of features depicted in FIGS. 2, 3a, 3b, and 3c. The input shaft 58 is arranged coaxially with the output shaft 60. In the illustrative form the input shaft 58 is smaller in diameter than the output shaft 60 and is thus located radially inward of the output shaft 60. The terms "input" and "output" are not intended to be limiting regarding the use of the shafts. For example, the input shaft 58 can be used to drive the lift fan 54 while the output shaft 60 can be driven by the aircraft engine 50. In these forms the shaft 60 can be used to drive the lift fan 54 and the shaft 58 can be driven by the aircraft engine 50.

In one form the input shaft 58 includes inner plates 62 and 64, energy members 66 and 68, and stops 70 and 72. The inner plates 62 and 64 are slidably engaged with the input shaft 58 and are operable to be engaged with corresponding plates associated with the output shaft 60. The inner plates 62 and 64 include friction surfaces on one or more of its sides 74 and 76, respectively. The friction surfaces of the sides 74 and/or 76 can be any surface having attributes associated with abradable surfaces or wear surfaces in the brake, clutch, and/or transmission arts such as, but not limited to, toughness, strength, heat resistance, adequate frictional properties, and/or relatively long life. In some forms the friction surfaces can be textured, roughened, and/or grooved. The friction surfaces can be made from a variety of materials including, but not limited to, steel, bronze, iron, iron-bronze, metallic ceramic, and metallic graphite. Though only two inner plates 62 and 64 are depicted in the illustrative embodiment, any number of inner plates can be used in other embodiments.

The energy members 66 and 68 provide a force to return the inner plates 62 and 64 to an initial position after being deflected. The energy members 66 and 68 have one end coupled with the input shaft 58 and another end coupled with the inner plates 62 and 64, respectively.

The energy members 66 and 68 are in the form of a bellows spring in the illustrative embodiment but can take a variety of other forms including a helical coil spring, a leaf spring, and a cantilever spring, to set forth just a few non-limiting examples. In some forms the energy members 66 and 68 can be an elastomeric material. Though only single energy members 66 and 68 are coupled with each of the inner plates 62 and 68, in some embodiments multiple energy members can also be used.

The stops 70 and 72 are used to react the force imparted to the inner plates 62 and 64 by the energy members 66 and 68 and can be integrally formed or coupled with the input shaft 58. The stops 70 and 72 have an outside dimension larger than an inside dimension of the inner plates 62 and 64. In one form the stops 70 and 72 have a circular periphery that is at a constant diameter from a center of the input shaft 58. In other embodiments the stops 70 and 72 can take on a variety of different forms. Other stops may also be used. For example, though a stop is not shown between the inner plates 62 and 64, one or more stops may be provided in that space to stop movement of the inner plate 64 away from the aft stop 72.

Figure 3A:
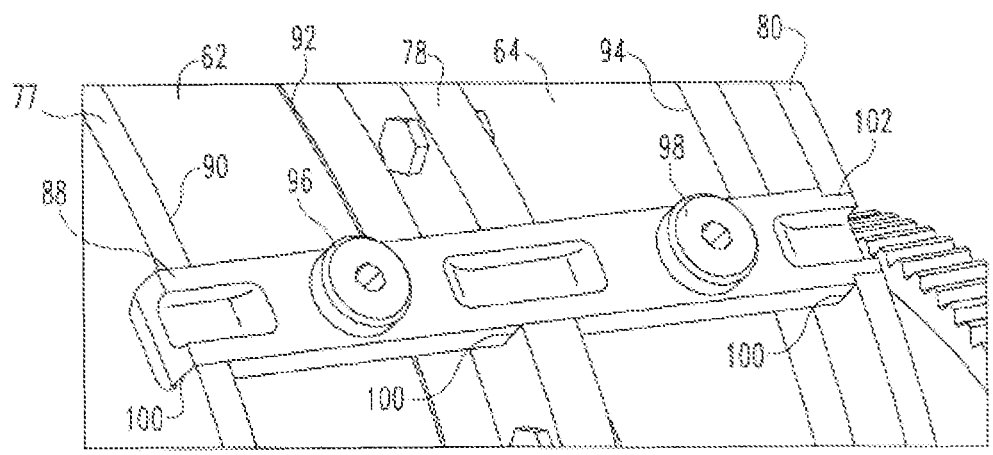
FIG. 3a depicts a partial perspective view of one embodiment of inner and outer plates.
Figure 3B:
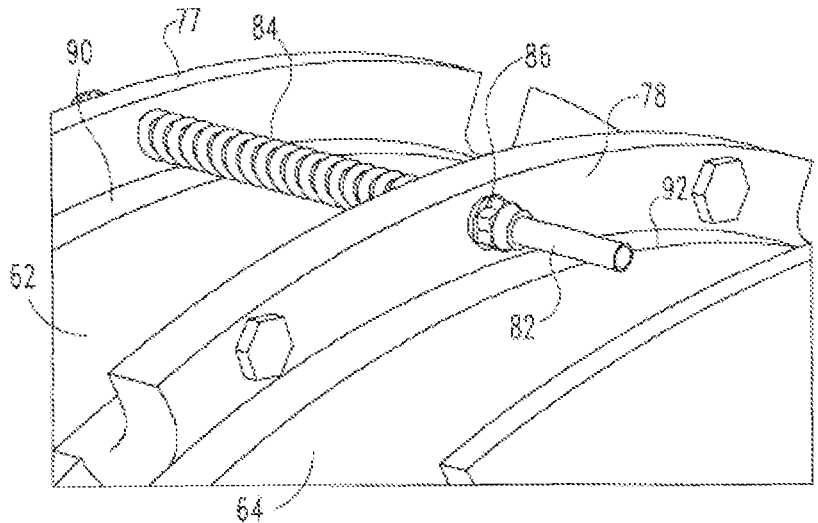
FIG. 3b depicts a partial perspective view of one embodiment of inner and outer plates.
Figure 3C:
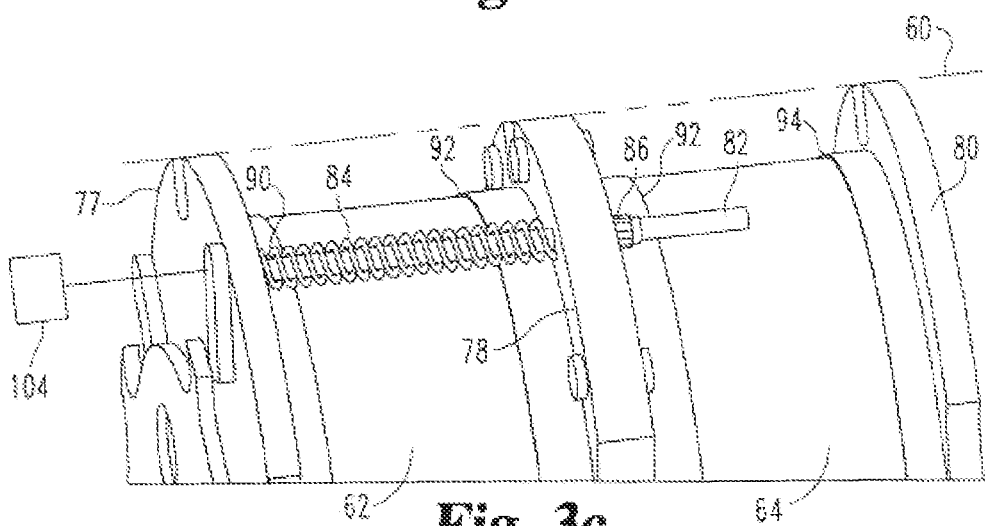
FIG. 3c depicts a partial perspective view of one embodiment of inner and outer plates.

In one form the output shaft 60 (shown in phantom in FIG. 3c) includes outer plates 77, 78, and 80, travel member 82, energy member 84 and lug key 88 (shown in FIG. 3a). The outer plates 77, 78, and 80 are operable to be engaged with the inner plates 62 and 64. The outer plates 77, 78, and 80 include friction surfaces on one or more of its sides 90, 92, and 94, respectively. The friction surfaces of the sides 90, 92, and/or 94 can be any surface having attributes associated with abradable surfaces or wear surfaces in the brake, clutch, and/or transmission arts such as, but not limited to, toughness, strength, heat resistance, adequate frictional properties, and/or relatively long life. In some forms the friction surfaces can be textured, roughened, and/or grooved. The friction surfaces can be made from a variety of materials including, but not limited to, steel, bronze, iron, iron-bronze, metallic ceramic, and metallic graphite. Though only three outer plates 77, 78, and 80 are depicted in the illustrative embodiment, any number of outer plates can be used in other embodiments.

The lug key 88 is coupled to the output shaft 60 through attachment members 96 and 98. The attachment members 96 and 98 can be bolts threadingly received in apertures formed in the lug key 88, but other forms are contemplated herein. To set forth just one non-limiting example, the attachment members 96 and 98 can rivets that are riveted to the output shaft 60.

The lug key 88 maintains the relative clocked orientation of the outer plates 77, 78, and 80 and is received in the illustrative embodiment by cutouts 100 formed in the outer periphery of the outer plates 77, 78, and 80. In other embodiments the lug key 88 can be received by apertures formed radially inward of the outer periphery of the outer plates 77, 78, and 80. Although one lug key 88 is depicted, multiple lug keys 88 can be used. The cutouts 100 need not be identical in each of the outer plates 77, 78, and 80. In addition, the lug key 88 need not have the same shape along its length. The lug key 88 permits the outer plates 77 and 78 to slide relative to the lug key 88. The lug key 88, however, includes a feature 102 that prevents the outer plate 80 from being slid in one direction.

The feature 102 is in the form of a notch in the illustrative embodiment, but in other embodiments the feature can take other forms. For example, the feature 102 can be a bolt or rivet to secure the outer plate 80 to the lug key 88.

The travel member 82 provides a structure that limits the relative movement between the outer plates 77 and 78 in at least one direction. In the illustrative embodiment the structure that limits relative movement is in the form of a nut 86 received on a threaded end of a rod of the travel member. The outer plates 77 and 78 are capable of moving relative to one another but not past the limit defined by the relative placement of the nut 86. The nut 86 can take other forms in different embodiments such as, but not limited to, cotter pins and lock nuts. In still other forms the end of the travel member 82 may not include a separate part such as the nut 86 or cotter pins or lock nuts. Instead, the end of the travel member 82 can be crimped such that the crimped end does not permit relative movement between the outer plates 77 and 78 past the crimped end.

In some forms the travel member 82 can be a structure that collapses when the outer plates 77 and 78 are moved toward each other and that assumes a tensioned state when the outer plates 77 and 78 are moved away from each other and the travel member 82 has reached its limit. In one non-limiting example, the travel member 82 can be a braided cable that collapses when the outer plates 77 and 78 are moved together but that is placed in tension when the outer plates 77 and 78 have moved to the limits of the length of the braided cable.

The energy member 84 provides a force to urge the outer plates 77 and 78 apart when they are moved to a relative position closer than the limit of the travel member 82. In some forms the energy member 84 may not provide a force at the limit of the travel member 82. The energy member 84 is in the form of a coil spring in the illustrative embodiment, but in other embodiments it may take other forms such as leaf spring and a cantilever spring, to set forth just two non-limiting examples. More than one energy member 84 can be used. In another embodiment, the energy member 84 can be a single coil spring that surrounds the outer periphery of the inner plate 62.

In one embodiment the travel member 82 can be combined with the lug key 88. For example, the lug key 88 can include features to provide a limit to the relative movement between the outer plates 77 and 78. For example, the lug key 88 can include a slidable portion that moves with the relative movement of the outer plates 77 and 78. The lug key 88 can still be coupled to the output shaft 60 through attachment members 96 and 98. The energy member 84 can also be integrated into the assembly to urge the outer plates 77 and 78 apart.

An actuator 104 is coupled to the outer plate 77 and is used to move the outer plate 77 toward and away from the other plates. The actuator 104 can be any type of actuator including hydraulic, electromechanical, or pneumatic, among potential others. The actuator 104, furthermore, is capable of providing movement at a variety of rates and with a variety of force.

In a first, uncoupled state, the input shaft 58 and the output shaft 60 are not coupled by the clutch 56. In this state the energy members 66 and 68 are capable of placing the inner plates 62 and 64 in a position characterized by a relative zero force exerted by the energy members 66 and 68 or in positions where the inner plate 62 is limited by stop 70 and/or the inner plate 64 is limited by a stop located in the space between the inner plates 62 and 64. The outer plates 77, 78, and 80 are placed in positions that do not contact, or partially contact, the inner plates 62 and 64. The actuator 104 withdraws the outer plate 77 away from the other plates and out of contact with the inner plate 62. By action of the energy member 84 and the position limiting effect of the travel member 82, the outer plate 78 is positioned between the inner plates 62 and 64. Finally, the outer plate 80 can stay relatively fixed such that the inner plate 64 moves away from the outer plate 80.

In a second, coupled state, the actuator 104 provides a force that moves the outer plate 77 toward the inner plate 62. By virtue of the travel member 82 and energy member 84, the outer plate 78 also moves with the outer plate 77 unless and/or until it reaches the inner plate 64. Contact of the outer plate 77 with the inner plate 62, the outer plate 78 with the inner plates 62 and 64, and the inner plate 64 with the outer plate 80 compresses the energy members 66, 68, and 84. In this condition the friction surfaces of the sides 74, 76, 90, 92, and 94 act to couple rotation of the input shaft 58 with the output shaft 60.

One aspect of the present application provides for a lift fan clutch capable of coupling an input shaft from a gas turbine engine with an output shaft that drives a lift fan. In one embodiment the clutch is a multi-plate clutch having inner plates driven by inner lug features and outer plates driven by outer lug features. The inner plates are coupled to an input shaft with springs. The outer plates are coupled to the output shaft with a key lug that permits slidable engagement with all but one of the outer plates. A guide rod and spring are used to allow relative motion between two of the outer plates but the guide rod provides a maximum limit of the distance that the two outpour plates can be placed relative to one another. When engaged, frictional surfaces of the inner plates meet with friction surfaces of the outer plates to couple the input shaft to the output shaft. When disengaged the springs of the inner plates and the guide rod and spring of the outer plates force the inner and outer plates into a no-contact or minimal contact position.

Another aspect of the present application provides a lift fan shaft coupling apparatus comprising a lift fan multi-plate clutch assembly useful in transmitting shaft power including a first shaft having a first plate located coaxially with a second shaft having a second plate, the first plate operable to be coupled to an actuator and operable to be moved relative to the actuator between a disengaged position and an engaged position, a mechanical stop coupled with the multi-plate clutch assembly and movable with the actuator, the mechanical stop operable to limit movement of the first plate in the disengaged position, and wherein the first plate and the second plate are in mechanical contact in the engaged position and are separated in the disengaged position, the engaged position permitting a rotation of one of the first shaft or second shaft to be transmitted to the other.

Still another aspect of the present application provides an apparatus comprising a lift fan clutch operable to modulate power between an aircraft powerplant and a vertical lift fan, the lift fan clutch having a first shaft first plate coupled to a first shaft and a second shaft first plate and second shaft second plate coupled with a second shaft, the first shaft first plate located between the second shaft first plate and the second shaft second plate operable to be placed in contact in an engaged state and operable to be separated in a disengaged state, the second shaft first plate and second shaft second plate operable to be moved relative to one another, a first energy device operable to return the first shaft first plate to a first shaft first plate disengaged position when in the disengaged state, a second energy device operable to provide a force to urge the second shaft first plate apart from the second shaft second plate when in the engaged state, and wherein the engaged state is operable to couple rotation of the first shaft and the second shaft.

Yet a still another aspect of the present application provides an apparatus comprising an aircraft vertical lift device, a vertical lift device clutch including an input shaft having an input plate coupled with an output shaft having an output plate, the vertical lift device clutch having an engaged position and a disengaged position, the engaged position operable to power the aircraft vertical lift device, and means for separating the input plate from the output plate in the disengaged position.

Still a further aspect of the present application provides a method comprising disengaging a lift fan from a drive shaft by separating a first shaft first plate, first shaft second plate, and a first shaft third plate from a second shaft first plate and a second shaft second plate, the separating including expanding a relative distance between the first shaft first plate and the first shaft second plate with a first energy device, the first shaft first plate and the first shaft second plate coupled with a first shaft, translating a second shaft first plate along a second shaft with a second energy device coupled to the second shaft, the second shaft first plate located between the first shaft first plate and the first shaft second plate, and shifting a second shaft second plate along the second shaft with a third energy device coupled to a second shaft, the second shaft second plate located on an opposite side of the first shaft second plate from the second shaft first plate.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a lift fan clutch operable to modulate power between an aircraft powerplant and a vertical lift fan, the lift fan clutch having:
        a first inner plate slidingly coupled to a first shaft
        a second inner plate slidingly coupled to the first shaft independently of the first inner plate;
        a first outer plate and a second outer plate slidingly coupled with a second shaft, the first inner plate located between the first outer plate and the second outer plate, the first outer plate located between the first inner plate and the second inner plate;
        wherein the plates are operable to be placed in contact in an engaged state and operable to be separated in a disengaged state, the first outer plate and second outer plate operable to be moved relative to one another;
        a first inner energy storage device having a first portion coupled with the first inner plate such that the first portion is stationary with respect to the first inner plate and a second portion coupled with the first shaft such that the second portion is stationary with respect to the first shaft, and such that the first inner energy storage device provides a force that opposes relative motion between the first inner plate and the first shaft, wherein the first inner energy storage device is operable to return the first inner plate to a first inner plate disengaged position when in the disengaged state;

a second inner energy storage device having a first portion coupled with the second inner plate such that the first portion is stationary with respect to the second inner plate and a second portion coupled with the first shaft such that the second portion is stationary with respect to the first shaft, and such that the second inner energy storage device provides a force that opposes relative motion between the second inner plate and the first shaft, wherein the second inner energy storage device is operable to return the second inner plate to a second inner plate disengaged position when in the disengaged state;

an outer energy storage device connected between the first outer plate and the second outer plate such that the outer energy storage device provides a force that opposes relative motion between the first outer plate and the second outer plate, wherein the outer energy storage device is operable to provide a force to urge the first outer plate apart from the second outer plate when in the engaged state; and wherein the engaged state is operable to couple rotation of the first shaft and the second shaft.

2. The apparatus of claim 1, wherein the first outer plate is slidingly coupled to the second outer plate with a travel member having a mechanical stop operable to limit a maximum relative distance between the first outer plate and the second outer plate.

3. The apparatus of claim 2, wherein the outer energy storage device is coupled to the travel member.

4. The apparatus of claim 3, which further includes a lug key coupled to the second shaft and slidingly coupled with the first outer plate and the second outer plate.

5. The apparatus of claim 1, which further includes a second shaft end plate coupled to the second shaft, the first outer plate and second outer plate coupled through a lug key to the second shaft end plate, the lug key permitting sliding movement of the first outer plate and the second outer plate relative to the second shaft end plate.

6. The apparatus of claim 5, the first shaft including a mechanical stop that limits movement of the second inner plate.

7. A method comprising:

providing the apparatus of claim 1;

disengaging a lift fan coupled to the apparatus of claim 1 by separating the first outer plate, the second outer plate, and a third outer plate from the first inner plate and the second inner plate, the separating including:

expanding a relative distance between the first outer plate and the second outer plate with the outer energy storage device, the first outer plate and the second outer plate coupled with the second shaft;

translating the first inner plate along a second the first shaft with the first inner energy storage device coupled to the first shaft, the first inner plate located between the first outer plate and the second outer plate; and shifting the second inner plate along the first shaft with the second energy storage device coupled to the first shaft, the second inner plate located on an opposite side of the second outer plate from the first inner plate.

8. The method of claim 7, which further includes limiting movement of the first outer plate relative to the second outer plate with a mechanical limiter.

9. The method of claim 7, which further includes guiding the first outer plate and second outer plate with a lug key coupled to the second shaft.

* * * * *

UNITED STATES PATENT AND TRADEMARK OFFICE
CERTIFICATE OF CORRECTION

| | | |
|---|---|---|
| PATENT NO. | : 8,567,713 B2 | Page 1 of 1 |
| APPLICATION NO. | : 12/635525 | |
| DATED | : October 29, 2013 | |
| INVENTOR(S) | : Cookerly et al. | |

It is certified that error appears in the above-identified patent and that said Letters Patent is hereby corrected as shown below:

In the claims,

Col. 8, line 21 (Claim 7): remove the term "a second" so that the claim reads:

"...translating the first inner plate along the first shaft with the first inner energy storage device..."

Signed and Sealed this
Fifteenth Day of December, 2015

Michelle K. Lee
*Director of the United States Patent and Trademark Office*